April 14, 1964 G. D. McKENZIE 3,128,560
PIPE TEMPLETS AND METHODS OF CUTTING PIPE
Filed Oct. 12, 1961

INVENTOR
Gordon D. McKenzie
his attorneys 3,128,560
PIPE TEMPLETS AND METHODS OF
CUTTING PIPE
Gordon D. McKenzie, Ridgefield, Conn.
Filed Oct. 12, 1961, Ser. No. 144,742
5 Claims. (Cl. 33—174)

This invention relates to pipe templets and particularly to a templet for cutting holes in pipe to which branch pipe lines may be attached and to a method of marking and cutting pipe.

The problem of cutting pipe so that a branch line of smaller diameter may be attached or of cutting pipe so that angular connections might be attached has plagued the pipe fitting industry for many years. Various schemes have been devised for marking and cutting pipe so that a side arm or a junction could be made without loss of time and with a precise fitting together of the several elements going into the junction. The devices that have heretofore been proposed have been relatively complex and made up of a multiplicity of loose parts which were difficult to keep together as well as to use.

I have invented a templet and a method of cutting openings in pipe or attaching angular junctions on pipe which eliminates the problems of these prior art devices. Preferably, I provide a templet having an arcuate edge, whose radius is equal to the diameter of the outer periphery of the branch line pipe. A pair of slots are made in the templet on the radius of the center of the arc. A pair of slots are provided on each side of said center line spaced apart from the center line slots a distance equal to 90° on the periphery of the pipe being attached to a main pipe and parallel to the center line slots.

In the foregoing general description, I have set out certain purposes, objects and advantages of this invention. Other purposes, objects and advantages will be apparent from a consideration of the following description and the accompanying drawings in which.

Figure 1:
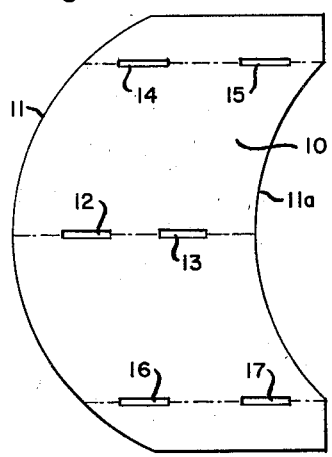
FIGURE 1 is a plan view of a templet according to my invention.
Figure 2:
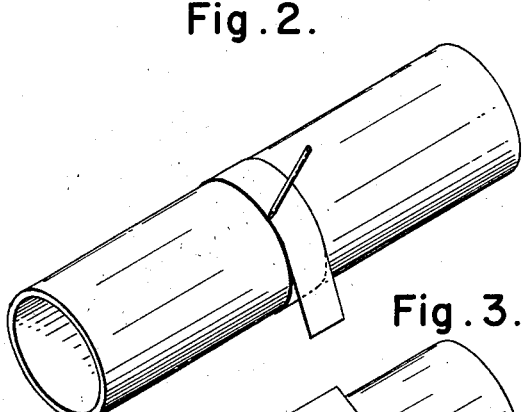
FIGURE 2 is an isometric view of a pipe to be cut with a base line being marked.
Figure 3:
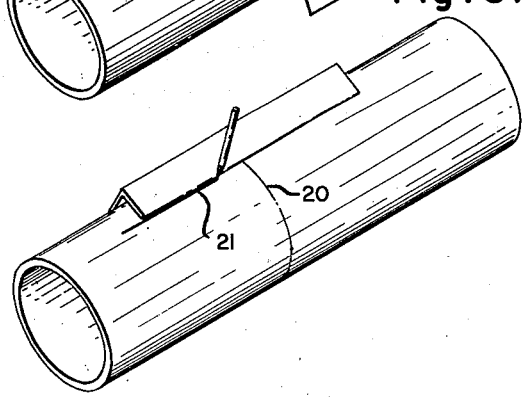
FIGURE 3 is an isometric view of a pipe showing the axial marking.

Referring to the drawings, I have illustrated a templet 10 having an arcuate edge 11. The arcuate edge 11 is formed with a radius equal to the diameter of the branch line pipe. A second spaced parallel arcuate edge 11a is preferably provided. Slots 12 and 13 are formed on the radius of the center of arcuate edge 11. Slots 14 and 15 are formed parallel to the slots 12 and 13 on one side a distance equal to 90° on the periphery of the pipe being cut. A similar set of slots 16 and 17 are formed on the opposite sides of the slots 12 and 13 a like distance therefrom and on a parallel line.

Figure 4:
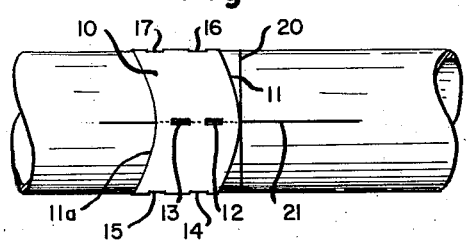
FIGURE 4 is a side elevation of a pipe with the templet applied in first position.
Figure 5:
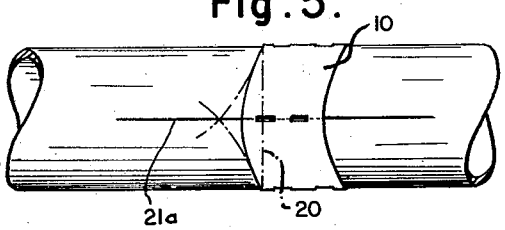
FIGURE 5 is a side elevation of the pipe of FIGURE 4 with the templet reversed.
Figure 6:
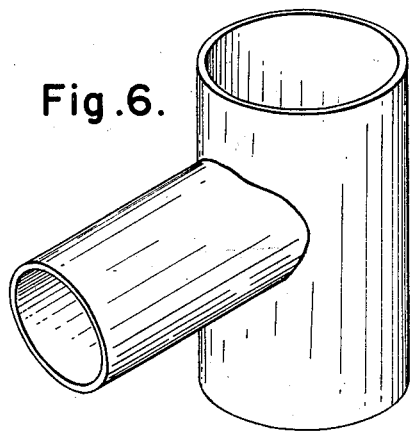
FIGURE 6 is an isometric view of the pipe in place on a main line.

The templet is applied and used in the following manner. An annular line 20 is formed around the pipe to be cut by wrapping a ribbon or band around the pipe and marking along an edge thereof. A line 21 parallel to the axis of the pipe is drawn on the pipe periphery intersecting the annular line. The slots 12 and 13 are placed on the line 21 with the arc 11 and the annular line 20 in tangential contact. An arc is drawn along the arc base 11. Marks are made through slots 14, 15, 16 and 17 and a straight line 21a is drawn through each pair of these marks parallel to line 21. The templet is then placed on the opposite side of the pipe with the slots 14, 15, 16 and 17 over the marks previously made through them and with the templet edge tangential to the annular line 20 on the opposite side of the pipe. A second arc is drawn. The templet is then moved 90° and rotated about itself 180° (see FIGURES 4 and 5) so that the slots 12 and 13 lie on the line 21a over the marks previously made through one of the sets of slots 14, 15, or 16 and 17, and with the arc tangential to the two arcs previously made, and a smooth arcuate line drawn connecting the tangential points. This is repeated on the opposite side of the pipe. The result will be a smooth curve. The pipe is cut along the curve and is adapted to be fitted precisely over the surface of the pipe to which it is to be connected.

The opening in the main line can be drawn by placing the side arm pipe so formed in position and marking it. After the main line is cut, the side arm is fitted and welded into position with a resultant closely fitting joint without the need for the cut and try experiments which have heretofore prevailed in the trade.

It is obvious that separate templets for all pipe sizes may be preferred as described hereinabove and that the same effective results may be attained.

I have illustrated certain preferred embodiments of my invention in the foregoing specification. It will be understood, however, that this invention may be otherwise embodied within the scope of the following claims.

I claim:

1. A templet for cutting pipe to fit onto the curved surface of a main line pipe comprising a flexible sheet having an arcuate edge whose radius is equal to the diameter of the outer periphery of the pipe to be cut and whose chord is greater than one half of the circumference of the pipe to be cut, center indexing means on the radius of the center of the arc, and second indexing means on each side of said center indexing means spaced apart from the center indexing means a distance equal to one fourth of the circumference of the pipe to be cut and parallel thereto.

2. A templet for cutting pipe to fit onto the curved surface of a main line pipe comprising a flexible sheet having an arcuate edge whose radius is equal to the diameter of the outer periphery of the pipe to be cut and whose chord is greater than one half of the circumference of the pipe to be cut, a pair of center line slots on the radius of the center of the arc, and a pair of slots on each side of said center line slots spaced apart from the center line slots a distance equal to one fourth of the circumference of the pipe to be cut and parallel thereto.

3. A templet for cutting pipe to fit onto the curved surface of a main line pipe comprising a flexible sheet having a pair of spaced parallel arcuate edges whose radius is equal to the diameter of the outer periphery of the pipe to be cut and at least one of which has a chord greater than one half of the circumference of the pipe to be cut, center indexing means on the radius of the center of the arc, and second indexing means on each side of said center indexing means spaced apart from the center indexing means a distance equal to one fourth of the circumference of the pipe to be cut and parallel thereto.

4. A templet for cutting pipe to fit onto the curved surface of a main line pipe comprising a flexible sheet having a pair of spaced parallel arcuate edges whose radius is equal to the diameter of the outer periphery of the pipe to be cut and at least one of which has a chord greater than one half of the circumference of the pipe to be cut, a pair of center line slots in the radius of the center of the arc, and a pair of slots on each side of said center line slots spaced apart from the center line slots a distance equal to one fourth of the circumference of the pipe to be cut and parallel thereto.

5. A template for cutting pipe and openings in pipe for the addition of annular junctions comprising a flexible sheet having an arcuate edge whose radius is equal to the diameter of the outer periphery of the branch line pipe to be attached to the main line, a center indexing slot on the index of the center of the arc, and second indexing slots on each side of said center indexing slot spaced apart from the center indexing slot a distance equal to one fourth of the circumference of the branch line pipe and substantially parallel to the center indexing slot.

References Cited in the file of this patent

UNITED STATES PATENTS

| | | |
|---|---|---|
| 141,645 | Home | Aug. 12, 1873 |
| 1,568,876 | Campbell et al. | Jan. 5, 1926 |
| 2,653,387 | Cameron | Sept. 29, 1953 |

FOREIGN PATENTS

| | | |
|---|---|---|
| 1,010,461 | France | Mar. 26, 1952 |